United States Patent
Karuzic et al.

(10) Patent No.: US 12,438,421 B2
(45) Date of Patent: Oct. 7, 2025

(54) METHOD OF OPTIMIZING A SYNCHRONOUS RELUCTANCE MOTOR ASSISTED BY MAGNETS

(71) Applicants: ENERDRIVE LIMITED, Wanchai (HK); ENERDRIVE SRL, Vicenza (IT)

(72) Inventors: Boris Karuzic, Vicenza (IT); Davor Filipeti, Vicenza (IT); Antonio Prearo, Vicenza (IT); Roberto Lotto, Vicenza (IT)

(73) Assignees: ENERDRIVE LIMITED, Wanchai (HK); ENERDRIVE SRL, Vicenza (IT)

( * ) Notice: Subject to any disclaimer, the term of this patent is extended or adjusted under 35 U.S.C. 154(b) by 414 days.

(21) Appl. No.: 17/998,775

(22) PCT Filed: May 18, 2021

(86) PCT No.: PCT/IT2021/050148
§ 371 (c)(1),
(2) Date: Nov. 14, 2022

(87) PCT Pub. No.: WO2021/234749
PCT Pub. Date: Nov. 25, 2021

(65) Prior Publication Data
US 2023/0208222 A1 Jun. 29, 2023

(30) Foreign Application Priority Data
May 22, 2020 (IT) ............... 102020000012094

(51) Int. Cl.
*H02K 15/03* (2025.01)
*H02K 1/24* (2006.01)
*H02K 19/10* (2006.01)

(52) U.S. Cl.
CPC ............. *H02K 15/03* (2013.01); *H02K 1/246* (2013.01); *H02K 19/103* (2013.01); *H02K 2213/03* (2013.01); *Y10T 29/49009* (2015.01)

(58) Field of Classification Search
CPC ........ H02K 15/03; H02K 15/00; H02K 15/12; H02K 19/02; Y10T 29/49009
(Continued)

(56) References Cited

U.S. PATENT DOCUMENTS 11,038,388 B2 * 6/2021 Soma ................... H02K 1/2766
11,594,922 B2 * 2/2023 Dong ..................... H02K 1/276
2018/0269734 A1 9/2018 Soma et al.

FOREIGN PATENT DOCUMENTS

DE 102019110013 A1 10/2019

OTHER PUBLICATIONS

International Search Report & Written Opinion dated Sep. 14, 2021 from PCT Application No. PCT/IT2021/050148.
(Continued)

*Primary Examiner* — Thiem D Phan
(74) *Attorney, Agent, or Firm* — INNOVATION CAPITAL LAW GROUP, LLP; Vic Lin

(57) ABSTRACT

Described is a method for optimizing a synchronous reluctance motor assisted by magnets (1), comprising the arrangement of a stator (2) provided with a number (t) of slots (3), the arrangement of a rotor (4) having an outer cylindrical surface ($S_e$) of radius ($r_e$), an inner cylindrical surface ($S_I$) of radius ($r_I$), a rotation axis (A) and a number (p) of pole pairs, realisation in the rotor (4) of a number (n) of slots (7) defining flow barriers ($B_n$) with axial extension for each pole of the motor (1), designed to house magnets (6) and definition of each barrier ($B_{.sub.n}$) with peripheral profile in the form of a circular segment with convexity facing towards the axis (A) and with
(Continued)

concentric radii of curvature ($r_{nA}$, $r_{nB}$) with common centre (C) arranged along a radial axis (X). The number (n) of barriers ($B_n$) is greater than or equal to 3.

12 Claims, 2 Drawing Sheets

(58) Field of Classification Search
USPC .................................. 29/596, 598, 607, 609
See application file for complete search history.

(56) References Cited

OTHER PUBLICATIONS

Vagati Alfredo et al: "Design of Ferrite-Assisted Synchronous Reluctance Machines Robust Toward Demagnetization", IEEE Transactions on Industry Applications, IEEE Service Center, Piscataway, NJ, US, vol. 50, No. 3, May 1, 2014 (May 1, 2014), pp. 1768-1779.

* cited by examiner

METHOD OF OPTIMIZING A SYNCHRONOUS RELUCTANCE MOTOR ASSISTED BY MAGNETS

TECHNICAL FIELD

This invention is applicable generally to the technical field of rotating electrical machines and is particularly concerned with a method of optimizing a synchronous reluctance motor assisted by magnets.

BACKGROUND ART

The use of synchronous reluctance motors assisted by magnets, which can be connected to an electricity network by means of an inverter and operationally coupled, for example, to a resistive load, has long been known in the sector of rotating electrical machines.

An electric motor typically comprises a stator having a plurality of slots equipped with electrical windings and a rotor placed inside the stator and capable of rotating about an axis of rotation due to the magnetic field produced by the stator windings.

In addition, a synchronous reluctance motor assisted by magnets can be configured with a plurality of magnets located in slots within the rotor.

It is known that, depending on the type of application envisaged, the synchronous reluctance motor assisted by magnets may include magnets made of rare earth or ferrite.

It is also known that the reluctance motors assisted by magnets typically have a high torque ripple.

Generally speaking, the use of rare earths to make magnets enables higher performance levels in terms of the magnetic field produced and, therefore, higher torque density than ferrite.

However, rare-earth based magnets have the drawback that the base material, comprising, for example, neodymium-iron-boron or samarium-cobalt, has high costs as well as a high disposal cost compared to ferrite magnets.

In this invention, the expression "torque ripple" means the percentage of the difference between the maximum torque value $T_{max}$ and the minimum torque value $T_{min}$ related to the average value $T_{mean}$ according to the following relationship:

$$\text{ripple\%} = 100 \times \frac{T\max - T\min}{2 \times T\text{mean}} \quad [1]$$

In other words, the torque ripple is linked both to the phenomenon of the interaction between the magnetic field of the magnets and the stator slots, or cogging, but also, in an applied load situation, to the interaction between the magneto motor force and the flow harmonics through the air gap, the latter being understood as the distance between the stator and the rotor.

There is a need to determine a method of sizing the rotor barriers to overcome the drawbacks outlined above.

Technical Problem

In the light of the prior art, the technical problem which this invention is intended to solve is that of simultaneously achieving both maximum torque density and extremely low torque ripple without loss of power factor and using low-cost magnets.

DISCLOSURE OF THE INVENTION

The aim of the invention is to solve the above-mentioned problem by providing a method of optimizing a synchronous reluctance motor assisted by magnets with high efficiency characteristics and relative cost-effectiveness.

A particular aim of the invention is to make available a method of the type described above which makes it possible to use low-cost magnets and increase the electro-mechanical performance of the motor compared with conventional synchronous reluctance motors.

Another aim of the invention is to provide a method of the type described above that is versatile and easy to apply.

A further aim of the invention is to provide a method of the type described above which enables an motor to be constructed which guarantees correct operation also at high rotation speeds.

The above-mentioned aims, as well as others which will be described in more detail below, are achieved by a method of optimizing a synchronous reluctance motor assisted by magnets in accordance with claim 1, which comprises the steps of arranging a stator having a certain number of total slots for the stator windings, arranging a rotor substantially in the form of a circular crown, an outer cylindrical surface of outer radius, an inner cylindrical surface of inner radius, a rotation axis and a number of pole pairs.

The method also comprises making a number of slots in the rotor defining axial flow barriers for each pole of the motor and designed to house magnets, each of the barriers being defined with a peripheral profile in the form of a circular segment with convexity facing the axis of rotation and with concentric radii of curvature with a common centre arranged along a radial axis.

In addition, the number of barriers is kept equal to or greater than 3, the common centre is placed outside the outer cylindrical surface, each of the flow barriers has a constant thickness along its arcuate extension defined by the difference between the radii of curvature, the thicknesses of the flow barriers are progressively decreasing from the inner surface to the outer surface of the rotor and with optimal thickness of the outer barrier equal to $b_n = k_{n-1} b_1$, where $k_{n-1}$ is a numerical coefficient relative to the generic n-th barrier corresponding to a substantially constant magnetic permeance through the barriers and to a response to a quadrature excitation current with minimum harmonic content.

Advantageous embodiments of the invention are obtained in accordance with the dependent claims.

BRIEF DESCRIPTION OF THE DRAWINGS

Further features and advantages of the invention will become more apparent in the light of the detailed description of a preferred but not exclusive embodiment of a method of optimization of a synchronous reluctance motor assisted by magnets such as the one mentioned above, illustrated by way of non-limiting example with the aid of the following drawings in which.

DETAILED DESCRIPTION OF A PREFERRED EXAMPLE EMBODIMENT

Figure 1:
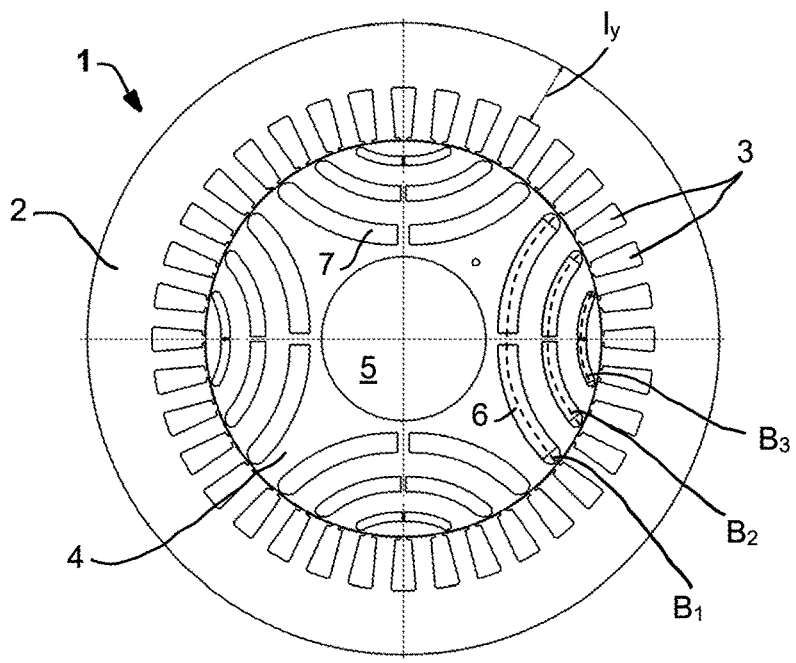
FIG. 1 is a sectional view of a synchronous reluctance motor assisted by magnets, designed using the method according to the invention.

With particular reference to the drawings, a method of optimizing a synchronous reluctance motor assisted by magnets, referred to in its entirety by reference numeral 1, is illustrated schematically in FIG. 1.

In a known manner, the motor 1 is powered by a source of electrical energy and is subjected to a resistant load acting on the motor shaft or on a machine driven by the motor, such as, for example, a pump or a machine tool.

The electric motor 1 typically comprises a stator 2 provided with a number t of stator slots 3 for the electrical stator windings, not illustrated in the drawings, which are powered by the source of electricity to generate a variable magnetic field.

The motor 1 further comprises a rotor 4, substantially in the form of a circular crown having an outer surface $S_e$ and an inner surface $S_i$.

Typically, the rotor 4 is housed within the substantially cylindrical central slot 2' of the stator 2 and is separated from the inner wall of this slot by a minimum peripheral distance 4', known as the air gap, of a size sufficient to prevent sliding contact even at the maximum speed of rotation of the rotor.

A drive shaft 5 is rigidly attached to the central part of the rotor 4 to transmit the power generated by the motor to the resistant load and has an axis of rotation A.

According to an embodiment, the rotor 4 comprises a plurality of laminar elements, not visible in the drawings, bundled together and integral with the drive shaft 5, the outer peripheral edge of which defines the outer surface $S_e$ and the inner peripheral edge of which defines the inner surface $S_i$ of the rotor 4 designed for coupling to the shaft 5.

Hereafter, unless otherwise indicated, the electric motor 1 is of the reluctance type assisted by internal magnets, that is to say, with magnets 6 inserted in appropriate slots between the outer surface $S_e$ and the inner surface $S_i$ of the rotor 4.

The internal arrangement of the rotor 4 and, thus, of the barriers B is determined by the optimization method according to the invention in order to optimize the performance of the reluctance motor 1 which is aimed at decreasing the torque ripple and increasing the power factor as well as the torque acting on the drive shaft 5.

The method involves constructing the stator 2 with a number t of stator slots 3 and an internal cylindrical slot 2'.

Moreover, the invention also provides for the construction of the rotor 4 having a number p of polar pairs, an external cylindrical surface $S_e$ of external radius $r_e$, an internal cylindrical surface $S_i$ of internal radius $r_i$, and its positioning in the internal slot 2' of the stator 2 so that it can rotate around the axis of rotation A coinciding with the axis of the drive shaft 5.

According to the method, a number n of rotor slots 7 are formed in the rotor 4, defining flow barriers $B_n$ with an axial extension for each pole of the motor and designed to house magnets 6.

Thus, in the rotor 4, predetermined portions of iron or solid material F and predetermined portions of hollow material are defined, defining the rotor slots 7 which define zones of minimum reluctance designed to guide and concentrate the magnetic flow during the operation of the motor 1 and which are referred to hereafter as barriers or flow barriers B.

For a correct dimensioning of the motor 1 and to reduce the losses in the iron, it is necessary that the total number t of stator slots 3 and the number n of barriers per pole Bn are linked together by the following relations as a function of the number of pole pairs p:

$$n \le \frac{t}{4p} - 1 \qquad [2]$$

$$\frac{t}{4p} - 1 < n \le \frac{t}{4p} + 1 \qquad [3]$$

The relations [2] and [3] are obtained by means of experimental tests designed to demonstrate how the different combinations of the numbers t of stator slots 3 and the number n of barriers $B_n$ for each pole give a different contribution in terms of iron losses.

These experimental tests have shown that:
with reference to relation [3], when 4p(n+1)>t the losses in the rotor iron are greater than the corresponding losses in the stator iron;
With reference to relation [2], when 4p(n+½)<t the losses in the stator iron are greater than the corresponding losses in the rotor iron;
when t−4p(n+½)=4p, the best benefits are obtained in terms of both rotor iron and torque ripple losses.

Figure 2:
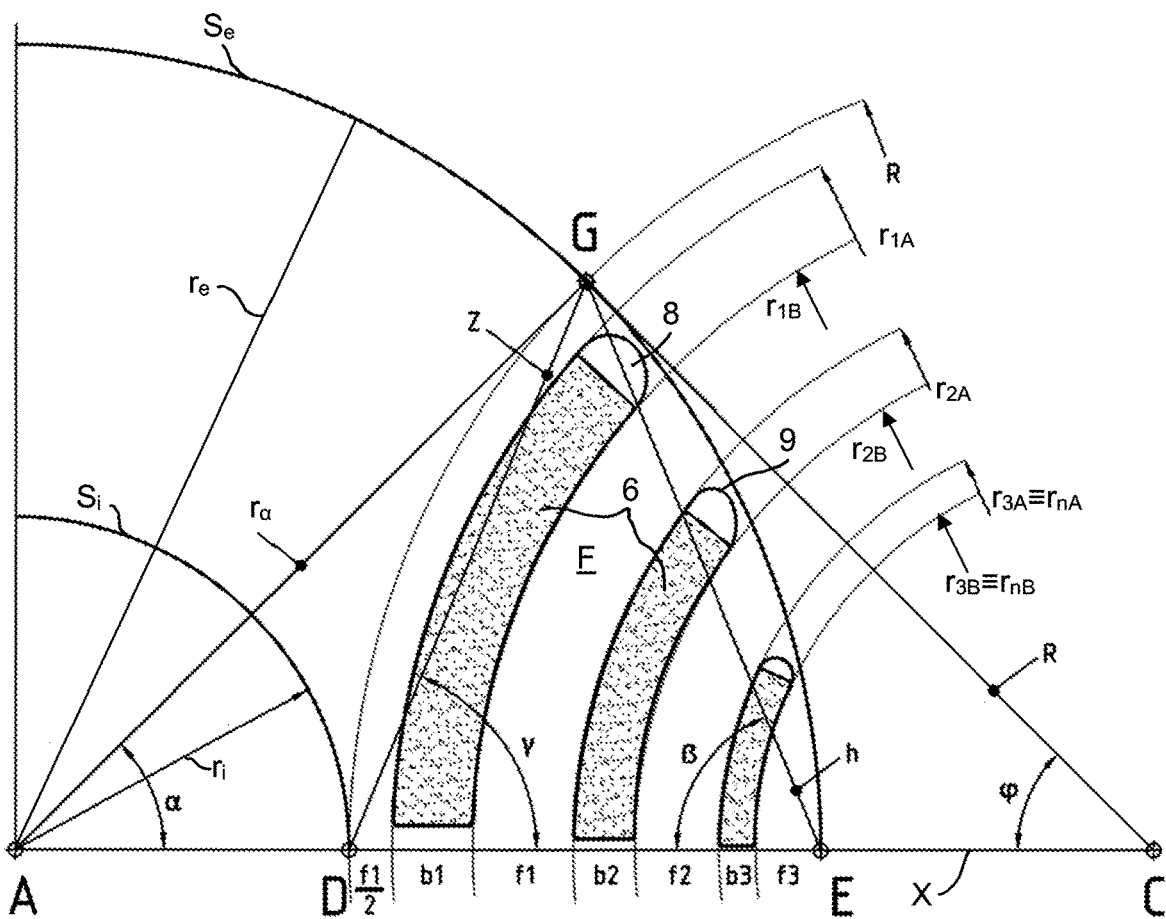
FIG. 2 is a representation of the steps of the method according to the invention with reference to each rotor pole of FIG. 1.

After the definition of the numbers n and t, the method according to the invention comprises a step of defining each of the barriers per pole $B_n$ with a peripheral profile in the form of a circular segment with convexity facing towards the axis of rotation A and with concentric radii of curvature $r_{nA}$, $r_{nB}$ with a common centre C arranged along a radial axis X, as clearly shown in FIG. 2.

The greatest advantages have been obtained with a number n of barriers per pole $B_n$ greater than or equal to 3 and with the common centre C placed outside the outer cylindrical surface $S_e$ of the rotor 4.

Moreover, each of the flow barriers per pole $B_n$ has a constant thickness $b_n$ along its arcuate extension defined by the difference between the radii of curvature $r_{nA}$, $r_{nB}$ of the peripheral profile of the barriers $B_n$ and the thicknesses $b_n$ are progressively decreasing from the inner surface $S_i$ to the outer surface $S_e$ of the rotor 4.

Conveniently, in the definition phase of the barriers Bn the optimal thickness bn is defined by the relation [4]:

$$b_n = k_{n-1} b_1 \qquad [4]$$

where $k_{n-1}$ is a numerical coefficient relating to the generic n-th barrier corresponding to a substantially constant magnetic permeance across the barriers $B_n$ and to a response to a quadrature excitation current with minimum harmonic content.

In particular, the above-mentioned harmonic content may be less than 4% of the fundamental and preferably not more than 2%.

In particular, $b_1$ identifies the thickness of the innermost barrier $B_1$ and close to the inner surface $S_i$ of the rotor 4.

The combination of features of the above-mentioned method ensures that a magnetic permeance as constant as possible is guaranteed across the $B_n$ barriers so that torque ripple is minimised.

Hereafter, the expression "magnetic permeance" means the ability of a material to pass energy through it and can be expressed as the ratio between the flow through the material and the magneto motor force applied to the material. This magnitude is therefore the inverse of reluctance.

Conveniently, in order to maintain a magnetic permeance as constant as possible through the barriers $B_n$, it is necessary to respect the technological limits of realization of each barrier and, more precisely, of the thickness bn of the barrier B most outermost and close to the surface $S_e$ of the rotor 4, represented with $b_3$ in FIG. 2.

The technological limit for the construction of the external barrier means the construction of the magnet 6 with a smaller thickness, which may not have a thickness b below a certain construction limit set by the magnet manufacturer in order not to lose the consistency of the magnet itself.

For this reason, in spite of the thickness values b of each barrier B calculated according to the method, it is necessary to assess the feasibility of making the corresponding magnets 6 and, if it is not greater than the minimum feasible thickness, a correction must be made to the calculation of the outermost barrier $B_n$.

It has been verified experimentally that when the number n of barriers per pole $B_n$ is determined by the relation [2] and is equal to 3, as in the examples shown in the drawings, the thickness $b_2$ of the intermediate barrier $B_2$ is obtained using a coefficient $k_1$ between 0.75 and 0.85, and therefore the thickness $b_2$ is between $0.75b_1$ and $0.85b_1$, while the thickness $b_3$ of the outermost barrier $B_3$ is obtained using a coefficient $k_2$ between 0.50 and 0.60, and therefore the thickness $b_3$ is between $0.50b_1$ and $0.60b_1$.

In greater detail, the method according to the invention is illustrated with reference to the schematic arrangement of FIG. 2, in which the thickness bn of the barriers per pole $B_n$ is obtained, for each plane orthogonal to the axis of rotation A, from the initial determination of a first point G obtained from the intersection of the external surface $S_e$ with a first radius $r_a$ of the rotor forming a first angle $\alpha$ with respect to the radial axis X.

Subsequently, a second point D obtained from the intersection of the internal surface $S_i$ with the radial axis X and a third point E obtained from the intersection of the internal surface $S_i$ with a secant h forming a second angle $\beta$ with the radial axis X will be determined.

Conveniently, the first angle $\alpha$, the second angle $\beta$ and the extension of the secant h are determined by the trigonometric relations [5], [6] and [7], respectively:

$$\alpha = \frac{\pi}{2p} \quad [5]$$

$$\beta = \frac{\pi - a}{2} \quad [6]$$

$$h = 2r_a \times \sin\left(\frac{a}{2}\right) \quad [7]$$

These relations can be deduced geometrically from the fact that the secant h connects the first point G with the third point E and from the fact that the radius $r_a$ and the segment connecting the axis A with the third point E have the same extension, determining an isosceles triangle G-A-E.

There is also a phase for determining a circle of radius R passing through the first G and second point D with centre of curvature C located on the radial axis X.

Conveniently, the radius R is calculated using the following trigonometric formulae:

$$R = \frac{z}{2 \times \sin\left(\frac{\varphi}{2}\right)} \quad [8]$$

$$z = \sqrt{(r_a - r_i)^2 + h^2 - 2(r_a - r_i)h \times \cos(\beta)} \quad [9]$$

$$\varphi = \pi - 2\gamma \quad [10]$$

$$\gamma = \arccos\left(\frac{z^2 + (r_a - r_i)^2 - h^2}{2(r_a - r_i)z}\right) \quad [11]$$

These relations can be derived from the fact that triangle G-D-C is isosceles with the sides D-C and G-C equivalent to the radius R.

Subsequently there are the stages of determining the total value of the iron or solid material F of rotor 4 and determining the corresponding number m of segments $f_m$ corresponding to the projections of the solid material F on the radial axis X as a function of the number n of barriers per pole $B_n$.

Preferably, the total value of the iron or solid material F of the rotor 4 is determined as a function of the thickness $l_y$ of the stator 2 and of the sum of the segments $f_m$ which is greater than this thickness $l_y$, as clearly illustrated in FIG. 1.

It has been shown experimentally that the total value of iron or solid material F of the rotor 4 is determined by the relation $1.1 l_y < F < 1.2 l_y$, which allows for the lowest additional losses in the rotor iron 4B to be obtained.

After calculating the lengths of the segments $f_m$, there is a phase to determine the radii of curvature $r_{1A}$, $r_{1B}$ and consequently the thickness $b_1$ of the innermost barrier $B_1$, as well as the thicknesses bn of the other barriers $B_n$ which are outermost and close to the external surface $S_e$ of the rotor 4.

In fact, the radii of curvature $r_{nA}$, $r_{nB}$ and the thickness $b_n$ of each barrier per pole $B_n$ is determined by the following relation:

$b_1 + b_2 + \ldots + b_n = r_a - r_i - F,$ where $b_2 = k_1 b_1$ $F = \frac{1}{2}f_1 + f_1 + f_2 + \ldots + f_m$ $f_2 = j_1 f_1$ $f_m = j_{m-1} f_1$ $r_{1A} = R - f_1/2$ $r_{1B} = r_{1A} - b_1$ $r_{2A} = r_{1A} - f_1 - b_1$ $r_{2B} = r_{2A} - b_2$ $r_{nA} = r_{(n-1)A} - f_{n-1} - b_{n-1}$ $r_{nB} = r_{nA} - b_n$  [12]

and where $j_1 \ldots j_{m-1}$ are numerical constants relating to generic f m-th segments, obtained by simulations and experimental results to obtain a substantially sinusoidal distribution of the magnetic flow in the rotor iron.

It has been shown experimentally that when the number of slots m of segments $f_m$ is equal to 3, as in the examples shown in the drawings, and when the number n of barriers per pole $B_n$ and the number t of total slots 3 of the stator windings is determined by the relation [2], the numerical constant $j_1$ is equal to 0.85 and the numerical constant $j_2$ is between 0.55 and 0.85.

Furthermore, the method according to the invention comprises determining the extension along the plane orthogonal to the axis A of the barriers per pole $B_n$ and of the space occupied by each magnet 6 within each barrier $B_n$ so as to maintain a substantially constant magnetic permeance, to optimize the magnetic flow density $B_{mag}$ in the magnets of the rotor 4 and to avoid the risk of demagnetization of the portions of the magnets 6 close to the air gap 4'.

The term magnetic flow density $B_{mag}$ used below means the working point of the magnetic flow.

The space occupied by each magnet 6 in each barrier $B_n$ is between 80% and 90% of the space of the respective barrier $B_n$.

These filling values allow for an empty portion 8 to be made within each barrier per pole $B_n$ devoid of both magnet 6 and solid material F which avoids the demagnetization of the magnetic portion 6 contained therein.

It should be noted that the filling of this empty portion 8 with magnetic material does not adversely affect the electromagnetic performance of the motor 1, but simply increases the production cost of the motor itself.

As better illustrated in FIG. 2, each pole barrier $B_n$ comprises a hollow portion 8 with an end 9 close to the outer surface $S_i$ having a rounded or arched shape for mechanical reasons related to the speed of rotation of the rotor and to the manufacturing processes for making the rotor 4, as well as to the insertion in each slot 7 of the magnets 6.

In particular, the apex of the end 9 of a barrier $B_n$ is equidistant to the apex of the preceding barrier $B_{n-1}$ and equal to the distance between the apex of the outermost barrier $B_n$ and the third point E.

The barriers B may be filled with magnets 6 made of ferrite and with a hollow portion 8 suitably calculated so as to obtain a reduced risk of demagnetization near the outer surface $S_e$ of the rotor 4.

Moreover, the use of ferrite makes it possible to reduce the costs of procuring the magnetic material and thus the cost of producing the rotor 4 compared with the use of magnets made from rare earths, even though this case is not covered by the invention.

However, the choice of material of the magnets 6 does not affect the optimization of motor 1 according to the invention in terms of power, torque and ripple.

In this way, flow densities are kept constant along the entire magnet 6 and consequently portions of magnets 6 at greater risk of demagnetization are avoided.

In addition, all the magnets 6 are radially magnetised in order to maximise the working point of the magnet in the motor 1 and thus to have a higher torque density and a better power factor over the entire operating range of motor 1.

To support the advantages of a motor 1 optimized according to the method described above, some simulations were carried out on a synchronous reluctance machine assisted by magnets, for which two rotors were designed with different B barrier designs even though they use the same amount of magnetic material.

The two rotors can be summarised as follows:
first rotor: optimized using the method described above and therefore comprising three barriers B with constant thickness $b_n$ along its arcuate extension defined by the difference between the radii of curvature $r_{nA}$, $r_{nB}$ of the peripheral profile of the barriers $B_n$ and the thicknesses $b_n$ are progressively decreasing from the inner surface $S_i$ to the outer surface $S_e$ of the rotor;
second rotor: having three curvilinear B barriers with the same thickness.

Moreover, the simulations were carried out to determine the magnetic remanence factor, or operating limit of the magnetic material, which can be expressed with the relation:

$$D_{emag} = \frac{B_{mag}}{B_{r0}} \times 100 \quad [13]$$

In the relation [13], the numerator value $B_{mag}$ is the working point of the magnetic flow and the denominator value $B_{r0}$ is the remanence of the magnetic flow, that is, the residual magnetic flow after the cancellation of the external field.

In both simulations, the magnets are made of ferrite with value $B_{r0}$ equal to 0.35 Tesla, with a total quantity of magnetic material of 2.8 kg and the rotor is rotated at a speed of 5000 rpm.

In addition, in order to reduce the risk of irreversible demagnetization of the magnets, it was assumed that the factor $D_{emag}(\%)$ would not fall below 20%.

The simulations have shown that the first rotor, optimized using the method according to the invention, maximises the performance obtainable both in terms of maximum power, obtaining a value of 100 kW, and nominal power, obtaining a value of 65 kW.

Moreover, for each barrier $B_1$, $B_2$, $B_3$, where the thicknesses $b_n$ are progressively decreasing from the inner surface $S_i$ to the outer surface $S_e$ and thus $b_1>b_2>b_3$, the values of the $D_{emag}$ factor (%) are 20% for $B_1$, 23% for $B_2$ and 30% for $B_3$.

By way of example, it has been assumed that the thicknesses $b_n$ of the first rotor are $b_1=7.2$ mm, $b_2=6$ mm, that is, between $0.75b_1$ and $0.85b_1$ and $b_3=3.9$ mm, that is, between $0.5b_1$ and $0.6b_1$.

The simulation of the second rotor showed an increased risk of demagnetization with regard to the magnets of the internal barriers $B_1$ and $B_2$, thus reducing the maximum power limit and obtaining a value of 87 kW, with a nominal power value of 62.6 kW.

Moreover, for each barrier $B_1$, $B_2$, $B_3$, where the thicknesses $b_n$ are equal to each other and therefore $b_1=b_2=b_3$, the values of the $D_{emag}$ factor (%) are 20% for $B_1$, 32% for $B_2$ and 52% for $B_3$.

For this reason, it is considered that only the first rotor, optimized using the method according to the invention, is able to reconcile a greater resistance to demagnetization together with an optimization of the reluctance phenomenon, enabling the best performance to be achieved with the same use of magnetic material.

The optimization method according to the invention was implemented by building a synchronous reluctance machine assisted by internal magnets with a nominal power of 2.2 kW, 4 poles and a nominal torque of 14 Nm, in order to measure the efficiency and the power factor.

Experimental tests were carried out on this machine, the results of which are given below.

The motor was rotated at a speed rotation of 1500 rpm, increasing the value of torque at the shaft T (%) and obtaining the values shown in Table 1 below.

TABLE 1

| T (%) | T (Nm) | $P_M$ (kW) | $P_E$ (kW) | I (A) | ε (%) | P.F. (°) |
|---|---|---|---|---|---|---|
| 20 | 2.75 | 0.432 | 0.466 | 1.43 | 92.64 | 0.962 |
| 30 | 4.63 | 0.727 | 0.771 | 1.94 | 94.27 | 0.924 |
| 40 | 5.60 | 0.879 | 0.928 | 2.30 | 94.73 | 0.900 |
| 60 | 8.30 | 1.303 | 1.263 | 2.98 | 95.59 | 0.880 |
| 80 | 11.21 | 1.760 | 1.838 | 3.72 | 95.74 | 0.879 |
| 90 | 12.86 | 2.019 | 2.107 | 3.95 | 95.81 | 0.880 |
| 100 | 14.10 | 2.213 | 2.309 | 4.33 | 95.86 | 0.880 |
| 120 | 16.60 | 2.606 | 2.720 | 4.90 | 95.80 | 0.893 |
| 140 | 19.38 | 3.042 | 3.180 | 5.56 | 95.67 | 0.919 |
| 160 | 22.30 | 3.501 | 3.669 | 6.25 | 95.41 | 0.935 |
| 180 | 24.60 | 3.862 | 4.054 | 6.85 | 95.25 | 0.943 | where:
T (Nm) is the torque applied to the crankshaft and measured by means of a torque meter;

$P_M$ (kW) is the mechanical power calculated as the product of the torque T applied to the shaft and the speed of rotation;

$P_E$ (kW) is the electrical power supplied as input to the motor power supply terminals;

I (A) is the current absorbed by the motor;

ε(%) is the efficiency of the motor and calculated as the ratio between the power output of the motor and the power applied;

P.F. (°) is the power factor measured at the motor terminals.

Figure 3:
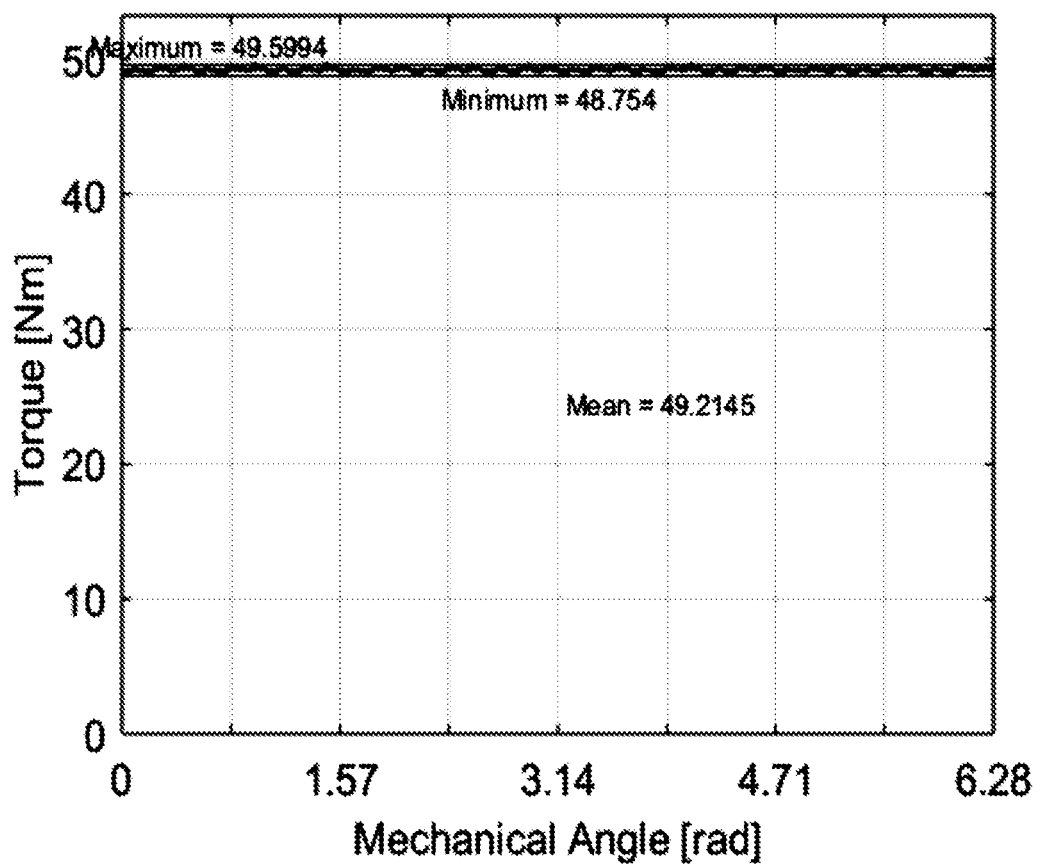
FIG. 3 is a representation of the torque ripple of an experimental test on a motor made implementing the method according to the invention.

Subsequently, a second experimental test was carried out on a synchronous reluctance machine assisted by internal magnets built according to the method described above and having a nominal power of 7.5 kW, 4 poles and a nominal speed of 1200 rpm, in order to measure the torque ripple, as shown in FIG. 3.

The motor has rotor thicknesses $b_n$ equal to $b_1$=5.8 mm, $b_2$=4.9 mm and $b_3$=3.5 mm, and segment values $f_m$ equal to $f_1$=6.65 mm, $f_2$=5.65 mm and $f_3$=4.54 mm.

The test showed that the torque ripple calculated according to the relation [1] is 0.86% peak.

From the above, it is clear that the method of optimizing a synchronous reluctance motor assisted by magnets according to the invention achieves the intended aims and in particular makes it possible to minimise the torque ripple, increase the power factor as well as the motor torque while using low-cost magnets.

The method according to the invention is susceptible to numerous modifications and variations all within the scope of protection expressed in the attached claims.

Although the method has been described with particular reference to the accompanying drawings, the reference numbers used in the description and in the claims are used to improve the understanding of the invention and do not constitute any limitation to the claimed scope of protection.

Reference throughout the description to "an embodiment" or "the embodiment" or "certain embodiments" indicates that a particular feature, structure or element described is included in at least one embodiment according to the invention.

In addition, the particular features, structures or elements can be combined in any suitable way in one or more embodiments.

INDUSTRIAL APPLICABILITY

The invention is industrially applicable in that it can be implemented on an industrial scale by industries belonging to the sector of production of rotating electrical machines.

The invention claimed is:

1. Method of optimizing a synchronous reluctance motor (1) assisted by magnets, which method includes the following steps:

providing a stator (2) having a certain number (t) of stator slots (3) for stator windings;

providing a rotor (4) having a substantially circular crown shape, an external cylindrical surface ($S_e$) of external radius ($r_e$), an internal cylindrical surface (Si) of internal radius (n), a rotation axis (A) and a number (p) of polar pairs;

providing in said rotor (4) a number (n) of rotor slots (7) defining axially developed flow barriers (Bn) for each pole of the motor (1), adapted to house magnets (6);

providing each of said barriers (Bn) with peripheral profile in the shape of a circular segment with convexity facing said rotation axis (A) and with concentric radii of curvature ($r_nA$, $r_nB$) with common centre (C) arranged along a radial axis (X);

wherein said number (n) of barriers ($B_n$) per pole is greater than or equal to 3 and said common centre (C) is located outside said external cylindrical surface (Se);

wherein each of said flow barriers ($B_n$) per pole has a constant thickness (bn) along its arcuate development defined by the difference between said radii of curvature ($r_nA$, $r_nB$);

wherein the thicknesses (bn) of said barriers ($B_n$) are progressively decreasing from the internal surface (Si) to the external surface (Se) of the rotor (4) with optimal thickness (bn) of the external barrier (Bn) equal to bn=$k_n$–1b1, wherein kn–1 is a numerical coefficient relative to the $n^{th}$ barrier, said coefficient being determined so as to obtain a substantially constant magnetic permeance across the barriers ($B_n$) and a response to an excitation current in quadrature with minimum harmonic content, characterised in that said thickness (bn) of each of said barriers (Bn) per pole is obtained by the following steps:

determining a first point (G) obtained from the intersection of said external surface ($S_e$) with a first radius ($r_a$) of the rotor (4) forming a first angle (α) with respect to said radial axis (X);

determining a second point (D) obtained by the intersection of said internal surface (Si) with said radial axis (X) and a third point (E) obtained by the intersection of said internal surface (Si) with a secant (h) forming a second angle (B) with said radial axis (X);

determining a circumference of radius (R) passing through said first (G) and second point (D) with centre of curvature (C) located on said radial axis (X);

determining a total value of iron or solid material (F) of the rotor (4) and determining the corresponding number (m) of segments (fm) corresponding to the thickness of said iron or solid material (F) present between said barriers (Bn) per pole; and determining said radii of curvature ($r_nA$, $r_nB$) and consequently the thickness (bi) of the innermost barrier (Bi), wherein said radii of curvature ($r_nA$, $r_nB$) and said thickness (bn) of each barrier ($B_n$) per pole is determined by the relation b1+b2+ . . . +bn=ra–n–F, wherein b2=k1b1, wherein F=½f1+f1+f2+ . . . +fm, wherein f2=j1f1, wherein $f_m$=jm–1f1, wherein r1A=R–f½, wherein r1B=r1A–b1, wherein r2A=r1A–f1-b1, wherein r2B=12A–b2, wherein $r_n$A=r(n–1)A–fn–1–bn–1, wherein $r_n$B=$r_n$A–bn, and wherein j1 . . . $j_m$–1 are numerical constants relating to said segments (f) $m^{ths}$ obtained by means of experimental simulations and results, and adapted for obtaining a substantially sinusoidal distribution of the magnetic flux in the rotor iron.

2. Method as claimed in claim 1, wherein the space occupied by each magnet in each barrier ($B_n$) per pole is between 80% and 90% of the space of the respective barrier ($B_n$).

3. Method as claimed in claim 1, wherein said number (n) of barriers (Bn) per pole and said number (t) of total slots (3) of the stator windings are determined by the relation $$n \le \frac{t}{4p} - 1.$$

4. Method as claimed in claim 3, wherein when said number (n) of barriers (Bn) per pole is equal to 3 the thickness (b2) of the intermediate barrier (B2) is obtained with said numerical coefficient (ki) comprised between 0.75 and 0.85, with thickness (b2) comprised between 0.75b1 and 0.85b1, while the thickness (b3) of the outermost barrier (B3) is obtained with said coefficient (k2) comprised between 0.50 and 0.60, with thickness (b3) comprised between 0.50b1 and 0.60b1.

5. Method as claimed in claim 1, wherein said number (n) of barriers (Bn) per pole and said number (t) of total slots (3) of the stator windings are determined by the relation $$\frac{t}{4p} - 1 < n \le \frac{t}{4p} + 1.$$

6. Method as claimed in claim 1, wherein said first angle (α) is determined by the relation $$\alpha = \frac{\pi}{2p}.$$

7. Method as claimed in claim 1, wherein said secant (h) has a length equal to $$h = 2r_\alpha \times \sin\left(\frac{\alpha}{2}\right).$$

8. Method as claimed in claim 1, wherein said radius (R) is calculated by the formula $$R = \frac{z}{2 \times \sin\left(\frac{\varphi}{2}\right)}$$

wherein $$z = \sqrt{(r_\alpha - r_i)^2 + h^2 - 2(r_\alpha - r_i)h \times \cos(\beta)}$$

$$\beta = \frac{\pi - \alpha}{2}$$

$$\varphi = \pi - 2\gamma$$

$$\gamma = \arccos\left(\frac{z^2 + (r_\alpha - r_i)^2 - h^2}{2(r_\alpha - r_i)z}\right).$$

9. Method as claimed in claim 1, wherein said total value of iron or solid material (F) of the rotor (4) is determined as a function of the thickness of the stator ($l_y$), the sum of said segments (fm) being greater than said thickness of the stator ($l_y$).

10. Method as claimed in claim 1, wherein said total value of iron or solid material (F) of the rotor (4) is determined by the relation $1.1\, l_y < F < 1.2 l_y$, so as to obtain the minimum additional losses in the iron of rotor (4).

11. Method as claimed in claim 1, wherein when said number (m) of segments (f) is equal to 3, said number (n) of barriers (B) per pole and said number (t) of total slots (3) of the stator windings are determined by the relation $$n \le \frac{t}{4p} - 1$$

said numerical coefficient j1 is equal to 0.85 and said numerical coefficient j2 is comprised between 0.55 and 0.85.

12. Method as claimed in claim 1, wherein said barriers (B) per pole are filled with permanent ferrite magnets and with an empty portion (8) properly calculated so as to obtain a reduced risk of demagnetization in proximity of said external surface (Se) of the rotor (4).

* * * * *